(12) United States Patent
Fischer et al.

(10) Patent No.: US 12,216,019 B2
(45) Date of Patent: Feb. 4, 2025

(54) APPARATUSES FOR TESTING THE LATERAL AND AXIAL CONFOCALITY OF A SCANNING AND DESCANNING MICROSCOPE COMPONENT GROUP

(71) Applicant: Abberior Instruments GmbH, Göttingen (DE)

(72) Inventors: Joachim Fischer, Karlsruhe (DE); Matthias Henrich, Heidelberg (DE)

(73) Assignee: Abberior Instruments GmbH, Göttingen (DE)

( * ) Notice: Subject to any disclaimer, the term of this patent is extended or adjusted under 35 U.S.C. 154(b) by 206 days.

(21) Appl. No.: 18/085,831

(22) Filed: Dec. 21, 2022

(65) Prior Publication Data
US 2023/0194383 A1    Jun. 22, 2023

(30) Foreign Application Priority Data
Dec. 22, 2021   (DE) .................... 10 2021 134 384.4

(51) Int. Cl.
*G01M 11/02* (2006.01)
*G02B 21/00* (2006.01)

(52) U.S. Cl.
CPC ..... *G01M 11/0207* (2013.01); *G02B 21/0024* (2013.01)

(58) Field of Classification Search
CPC ............ G02B 21/0076; G02B 21/0032; G02B 21/008; G02B 21/0048; G02B 21/367;
(Continued)

(56) References Cited

U.S. PATENT DOCUMENTS 5,751,417 A    5/1998  Uhl et al.
6,167,173 A   12/2000  Schoeppe et al.
(Continued)

FOREIGN PATENT DOCUMENTS

DE    19906763 A1    8/2000
DE    19758745 C2    8/2003
(Continued)

OTHER PUBLICATIONS

EP Search Report in related EP Application No. 22212516, mailed May 17, 2023.

*Primary Examiner* — Michael P Stafira
(74) *Attorney, Agent, or Firm* — Thomas | Horstemeyer, LLP (57) ABSTRACT

An auxiliary apparatus for testing the confocality of a scanning and descanning microscope component group has a connector configured for connecting the auxiliary apparatus in a defined relative position to the scanning and descanning microscope component group, and an optical axis running at a fixed orientation with respect to the connector. Further, the auxiliary apparatus has an auxiliary detector with a plurality of auxiliary detection apertures in a plurality of auxiliary detection aperture positions that are arranged at distances in direction of the optical axis and laterally with respect to the optical axis; and an auxiliary light source providing auxiliary light through a plurality of auxiliary emission apertures in a plurality of auxiliary emission aperture positions arranged at distances in direction of the optical axis and laterally with respect to the optical axis.

26 Claims, 6 Drawing Sheets

(58) Field of Classification Search
CPC ............... G02B 21/16; G02B 21/002; G02B 21/0064; G02B 21/0036; G02B 21/0072; G02B 21/0044; G02B 21/361; G02B 21/0024; G02B 21/004; G02B 21/0084; G02B 21/06; G02B 21/0028; G02B 21/0056; G02B 21/0068; G02B 2207/113; G02B 21/006; G02B 27/58; G02B 27/141; G02B 21/10; G02B 2207/114; G02B 26/105; G02B 21/0052; G02B 27/62; G02B 7/005; G02B 21/0004; G02B 21/14; G02B 26/0833; G02B 21/365; G02B 26/101; G02B 21/0012; G02B 15/144113; G02B 21/24; G02B 27/0927; G02B 5/04; G02B 21/0008; G02B 21/02; G02B 21/025; G02B 21/082; G02B 21/18; G02B 27/0983; G02B 5/3083; G02B 21/00; G02B 21/245; G02B 23/04; G02B 26/06; G02B 26/10; G02B 6/04; G02B 13/0095; G02B 21/08; G02B 21/241; G02B 21/32; G02B 21/36; G02B 26/12; G02B 13/22; G02B 21/0096; G02B 26/0875; G02B 27/0031; G02B 27/0075; G02B 6/4204; G02B 17/0615; G02B 17/0636; G02B 21/086; G02B 21/364; G02B 23/2423; G02B 27/0977; G02B 27/646; G02B 13/18; G02B 21/22; G02B 23/2469; G02B 23/2476; G02B 23/2484; G02B 26/103; G02B 27/10; G02B 27/106; G02B 27/144; G02B 27/145; G02B 27/286; G02B 27/4211; G02B 27/4216; G02B 27/425; G02B 3/0037; G02B 5/005; G02B 5/08; G02B 5/28; G02B 5/3025; G02B 6/262; G02B 17/0652; G02B 21/0016; G02B 21/04; G02B 21/244; G02B 21/247; G02B 21/33; G02B 26/0841; G02B 26/085; G02B 27/0944; G02B 27/1006; G02B 27/147; G02B 27/283; G02B 3/005; G02B 3/0056; G02B 3/0087; G02B 3/14; G02B 6/0008; G02B 6/02328; G02B 6/02347; G02B 6/02361; G02B 6/02366; G02B 6/02371; G02B 6/1225; G02B 6/2552; G01M 11/0207

See application file for complete search history.

(56) References Cited

U.S. PATENT DOCUMENTS

| | | | |
|---|---|---|---|
| 6,355,919 | B1 | 3/2002 | Engelhardt et al. |
| 6,462,345 | B1 | 10/2002 | Simon et al. |
| 6,496,307 | B2* | 12/2002 | Engelhardt .......... G02B 21/008 359/368 |
| 8,477,418 | B2* | 7/2013 | Wilhelm ............ G02B 21/0032 385/33 |
| 8,759,745 | B2 | 6/2014 | Klose et al. |
| 9,564,291 | B1* | 2/2017 | Own ...................... C23C 14/24 |
| 11,131,630 | B2 | 9/2021 | Heine et al. |
| 2001/0028496 | A1* | 10/2001 | Engelhardt ........ G02B 21/0032 359/383 |
| 2003/0132394 | A1 | 7/2003 | Wolleschensky et al. |
| 2007/0086048 | A1* | 4/2007 | Steinert ............. G02B 21/0032 358/1.15 |
| 2007/0146869 | A1* | 6/2007 | Lauer ..................... G02B 5/005 359/368 |
| 2008/0151243 | A1* | 6/2008 | Seyfried ............ G02B 21/0064 356/326 |
| 2009/0303583 | A1 | 12/2009 | Klose et al. |
| 2013/0123759 | A1 | 5/2013 | Kang et al. |
| 2016/0327779 | A1* | 11/2016 | Hillman ............. G02B 21/0032 |
| 2018/0373010 | A1* | 12/2018 | Doi ........................ G01N 21/64 |
| 2022/0113523 | A1* | 4/2022 | Knebel ................ G02B 21/008 |
| 2022/0113524 | A1 | 4/2022 | Fischer |

FOREIGN PATENT DOCUMENTS

| | | | |
|---|---|---|---|
| DE | 102005020542 A1 | 11/2006 | |
| DE | 102019116626 A1 * | 12/2020 | ......... G02B 21/0032 |
| DE | 102019116626 B4 | 3/2021 | |
| EP | 2098892 A1 | 9/2009 | |
| EP | 2333501 A1 | 6/2011 | |
| JP | H06109958 A | 4/1994 | |
| JP | 2003227796 A * | 8/2003 | ......... G02B 21/0024 |
| JP | 4573524 B2 | 11/2010 | |
| JP | 5437052 B2 * | 3/2014 | |
| JP | 2019159341 A * | 9/2019 | ............ G01N 21/64 |
| WO | 9942885 A2 | 8/1999 | |
| WO | 2011047365 A1 | 4/2011 | |
| WO | WO-2017154895 A1 * | 9/2017 | ............ G01B 11/26 |
| WO | 2018042056 A1 | 3/2018 | |
| WO | 2020254303 A1 | 12/2020 | |

* cited by examiner

APPARATUSES FOR TESTING THE LATERAL AND AXIAL CONFOCALITY OF A SCANNING AND DESCANNING MICROSCOPE COMPONENT GROUP

CROSS REFERENCE TO RELATED APPLICATIONS

This application claims priority to German patent application DE 10 2021 134 384.4 entitled "Verfahren und Vorrichtungen zur Überprüfung der lateralen und axialen Konfokalität einer scannenden und entscannenden Mikroskopbaugruppe" and filed on Dec. 22, 2021.

FIELD

The invention relates to a scanning and descanning microscope component group comprising a testing device for testing the confocality of the microscope component group, and to an auxiliary apparatus for testing the confocality of a scanning and descanning microscope component group.

The scanning and descanning microscope component group comprises a light source providing illumination light, optics focusing the illumination light along an optical axis into a focal area, a detector detecting light coming out of the focal area, and a scanner scanning laterally with respect to the optical axis, the scanner being arranged between the light source and the detector, on the one side, and the focal area, on the other side.

In such as scanning and descanning microscope component group, a precise confocal arrangement of a detection aperture of the detector with respect to the focal area into which the illumination light of the light source is focused is important to optimally measure the light elicited by the illumination light in the focal area. A precise confocal arrangement of the detection aperture is achieved, if the detection aperture, regarding its image in the focal area, is arranged concentrically with respect to the focal area of the illumination light.

BACKGROUND

For testing the confocality of a scanning and descanning microscope component group comprising a light source providing illumination light, optics focusing the illumination light into a focus in a focal plane a detector detecting light coming out of the focus and having a detection aperture to be arranged confocally with respect to the focus, and a scanner between the light source and the detector, on the one side, and the focal plane, on the other side, international application publication WO 2020/254 303 A1 teaches to scan an auxiliary detection aperture of an auxiliary detector arranged in the focal plane with the focus of the illumination light by operating the scanner. In doing so, a first intensity distribution of the illumination light detected by the auxiliary detector is registered over different settings of the scanner. Further, the detection aperture of the detector is scanned with auxiliary light that emerges through an auxiliary emission aperture of an auxiliary light source arranged in the focal plane concentrically with respect to the auxiliary detection aperture by operating the scanner. In doing so, a second intensity distribution of the auxiliary light detected by the detector is registered over the different settings of the scanner. At least one difference between the first intensity distribution and the second intensity distribution over the different settings of the scanner is then used as a measure of an error of the confocality of the scanning and descanning microscope component group.

As an alternative to scanning the auxiliary detection aperture of the auxiliary detector with the focus of the illumination light, an auxiliary detection aperture of a separate auxiliary detector arranged concentrically with respect to the emission aperture of the light source may be scanned with the auxiliary light that emerges through the auxiliary emission aperture of the auxiliary light source arranged in the focal plane by operating the scanner to register the first intensity distribution by means of the separate auxiliary detector. Further, as an alternative to scanning the detection aperture of the detector with the auxiliary light from the auxiliary light source, the auxiliary detection aperture of the auxiliary detector arranged in the focal plane may be scanned with further auxiliary light that emerges through an auxiliary emission aperture of a separate auxiliary light source arranged concentrically with respect to the detection aperture by operating the scanner to register the second intensity distribution by means of the auxiliary detector.

The difference between the first intensity distribution and the second intensity distribution of particular interest is a difference in position between maxima or centers or centers of intensity of the two intensity distributions. For achieving or maintaining the desired confocality, any difference in position occurring is compensated for by a real or virtual relative shift of the detection aperture of the detector with respect to the light source.

The scanning and descanning microscope component group known from WO 2020/254 303 A1 may further include an objective to set up a laser scanning microscope. The focal plane in which at least the auxiliary detection aperture or the auxiliary emission aperture is arranged may be an intermediate image plane of such a laser scanning microscope, or arranged in a branch branching off a main beam path of such a laser scanning microscope.

The still is a need of an improvement of the testing of the confocality of a scanning and descanning microscope component group known from WO 2020/254 303 A1.

SUMMARY OF THE INVENTION

The present invention relates to a scanning and descanning microscope component group comprising a first light source having a first emission aperture and providing first illumination light emerging through the first emission aperture; focusing optics focusing the first illumination light along an optical axis into a focal area; a first detector having a first detection aperture and detecting first light coming out of the focal area; and a scanner arranged between the first light source and the first detector, on its one side, and the focal area, on its other side, the scanner being scanning laterally with respect to the optical axis. The scanning and descanning microscope component further comprises at least one of a first auxiliary detector arranged or to be arranged in the focal area, the first auxiliary detector comprising a plurality of auxiliary detection apertures in a plurality of auxiliary detection aperture positions arranged at distances in direction of the optical axis and laterally with respect to the optical axis; and an auxiliary light source arranged or to be arranged in the focal area and providing auxiliary light, the auxiliary light source comprising a plurality of auxiliary emission apertures in a plurality of auxiliary emission aperture positions arranged at distances in direction of the optical axis and laterally with respect to the optical axis, the auxiliary light emerging through the plurality of auxiliary emission apertures; wherein, if both the auxiliary detector and the auxiliary light source are arranged in the focal area, each auxiliary detection aperture is concentric with one auxiliary emission aperture. The scanning and descanning microscope component also comprises a testing device. The testing device is configured for scanning the plurality of auxiliary detection apertures of the auxiliary detector in the plurality of auxiliary detection aperture positions with the focused first illumination light by operating the scanner, wherein the testing device registers first intensity distributions of the first illumination light detected by the auxiliary detector over different settings of the scanner. As an alternative, a first further auxiliary detector having a first auxiliary detection aperture arranged concentrically with respect to the first emission aperture of the first light source is provided, wherein the testing device is configured for scanning the first auxiliary detection aperture with the auxiliary light that emerges through the plurality of auxiliary emission apertures of the auxiliary light source in the plurality of auxiliary emission aperture positions by operating the scanner, wherein the testing device registers first intensity distributions of the auxiliary light detected by the first further auxiliary detector over different settings of the scanner. Further, the testing device is configured for scanning the first detection aperture of the first detector with the auxiliary light that emerges through the plurality of auxiliary emission apertures of the auxiliary light source in the plurality of auxiliary emission aperture positions by operating the scanner, wherein the testing device registers second intensity distributions of the auxiliary light detected by the first detector over the settings of the scanner. As an alternative, a first further auxiliary light source providing first further auxiliary light and having a first further auxiliary emission aperture, which is arranged concentrically with respect to the first detection aperture and through which the first further auxiliary light emerges, is provided, wherein the testing device is configured for scanning the plurality of auxiliary detection apertures of the auxiliary detector in the plurality of auxiliary detection aperture positions with the first further auxiliary light by operating the scanner, wherein the testing device registers second intensity distributions of the first further auxiliary light detected by the first auxiliary detector over the settings of the scanner.

Further, the present invention relates to an other scanning and descanning microscope component group comprising a first light source having a first emission aperture and providing first illumination light emerging through the first emission aperture; focusing optics focusing the first illumination light along an optical axis into a focal area; a first detector having a first detection aperture and detecting first light coming out of the focal area; and a scanner arranged between the first light source and the first detector, on its one side, and the focal area, on its other side, the scanner being scanning laterally with respect to the optical axis. Further, the other scanning and descanning microscope component group comprises at least one of a first auxiliary detector arranged or to be arranged in the focal area, the first auxiliary detector comprising an auxiliary detection aperture that is moveable into a plurality of auxiliary detection aperture positions arranged at distances in direction of the optical axis; and an auxiliary light source arranged or to be arranged in the focal area and providing auxiliary light, the auxiliary light source comprising an auxiliary emission aperture moveable into a plurality of auxiliary emission aperture positions arranged at distances in direction of the optical axis, the auxiliary light emerging through the auxiliary emission aperture; wherein, if both the auxiliary detector and the auxiliary light source are arranged in the focal area, each auxiliary detection aperture is concentric with one auxiliary emission aperture. The other scanning and descanning microscope component group also comprises a testing device. The testing device is configured for scanning the auxiliary detection aperture of the auxiliary detector in the plurality of auxiliary detection aperture positions with the focused first illumination light by operating the scanner, wherein the testing device registers first intensity distributions of the first illumination light detected by the auxiliary detector over different settings of the scanner. As an alternative, a first further auxiliary detector having a first auxiliary detection aperture arranged concentrically with respect to the first emission aperture of the first light source is provided, wherein the testing device is configured for scanning the first auxiliary detection aperture with the auxiliary light that emerges through the auxiliary emission aperture of the auxiliary light source in the plurality of auxiliary emission aperture positions by operating the scanner, wherein the testing device registers first intensity distributions of the auxiliary light detected by the first further auxiliary detector over different settings of the scanner. Further, the testing device is configured for scanning the first detection aperture of the first detector with the auxiliary light that emerges through the auxiliary emission aperture of the auxiliary light source in the plurality of auxiliary emission aperture positions by operating the scanner, wherein the testing device registers second intensity distributions of the auxiliary light detected by the first detector over the settings of the scanner. As an alternative, a first further auxiliary light source providing first further auxiliary light and having a first further auxiliary emission aperture, which is arranged concentrically with respect to the first detection aperture and through which the first further auxiliary light emerges, is provided, wherein the testing device is configured for scanning the auxiliary detection aperture of the auxiliary detector in the plurality of auxiliary detection aperture positions with the first further auxiliary light by operating the scanner, wherein the testing device registers second intensity distributions of the first further auxiliary light detected by the first auxiliary detector over the settings of the scanner.

Even further, the present invention relates to an auxiliary apparatus for testing the confocality of a scanning and descanning microscope component group. The auxiliary apparatus comprises a connector configured for connecting the auxiliary apparatus in a defined relative position to the scanning and descanning microscope component group; and an optical axis running at a fixed orientation with respect to the connector. Further, the auxiliary apparatus comprises an auxiliary detector comprising an auxiliary detection aperture moveable with respect to the connector into a plurality of auxiliary detection aperture positions that are arranged at distances in direction of the optical axis; or a plurality of auxiliary detection apertures in a plurality of auxiliary detection aperture positions that are arranged at distances in direction of the optical axis and laterally with respect to the optical axis. Even further, the auxiliary apparatus comprises an a an auxiliary light source providing auxiliary light and comprising an auxiliary emission aperture moveable with respect to the connector into a plurality of auxiliary emission aperture positions arranged at a distance in direction of the optical axis; or a plurality of auxiliary emission apertures in a plurality of auxiliary emission aperture positions arranged at distances in direction of the optical axis and laterally with respect to the optical axis.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

The present disclosure augments the testing of the confocality of a scanning and to descanning microscope component group known from WO 2020/254 303 A1 with a testing of the axial confocality of the scanning and descanning microscope component group. For this purpose, at least one of a special auxiliary detector and a special auxiliary light source providing auxiliary light is used. The auxiliary detector may have an auxiliary detection aperture which is moveable into a plurality of auxiliary detection aperture positions arranged at distances in direction of the optical axis, or a plurality of auxiliary detection apertures in auxiliary detection aperture positions arranged at distances in direction of the optical axis and laterally with respect to the optical axis. The auxiliary light source may have an auxiliary emission aperture which is moveable into a plurality of auxiliary emission aperture positions arranged at distances in direction of the optical axis, or a plurality of auxiliary emission apertures in a plurality of auxiliary emission aperture positions arranged at distances in direction of the optical axis and laterally with respect to the optical axis, out of which the auxiliary light emerges.

If the at least one of the auxiliary detection aperture and the auxiliary emission aperture is moveable, this does not require a continues movability. Instead, it is essential that the auxiliary detection or emission aperture positions arranged at distances in the direction of the optical axis may be repeatedly approached precisely.

The at least one of the auxiliary detector and the auxiliary light source is arranged in a focal area of focusing optics of the scanning and descanning microscope component group, wherein, if both the auxiliary detector and the auxiliary light source are arranged in the focal area, the auxiliary detection aperture and the auxiliary emission aperture or the auxiliary detection apertures and the auxiliary emission apertures are concentrically arranged in pairs. This implies that either both the auxiliary detection aperture and the auxiliary emission aperture are moveable or both a plurality of auxiliary detection apertures and a plurality of auxiliary emission apertures are present.

The scanning and descanning microscope component group whose confocality is to be tested comprises a first light source providing first illumination light, focusing optics focusing the first illumination light along and optical axis into a focal area, a first detector comprising a first detection aperture and detecting first light coming out of the focal area, and a scanner scanning laterally with respect to the optical axis, the scanner being arranged between the first light source and the first detector, on the one side, and the focal area, on the other side.

The detector may be a point detector whose detection aperture is defined by the active surface area of its light sensitive element or a pin hole aperture arranged in front thereof. The detector may as well be an array detector comprising a plurality of light sensitive elements. Then, either the active surface area of a central light sensitive element or the totality of the active surface areas of a central group of the light sensitive elements or the totality of the active surface area of all light sensitive elements may be regarded as the detection aperture of the array detector. Generally, each auxiliary detector may also be designed either as a point detector or as an array detector, wherein a design as a point detector is sufficient as a general rule.

For testing both the lateral and the axial confocality of the scanning and descanning microscope component group, the at least one of the auxiliary detector and the auxiliary light source arranged in the focal area are used as follows.

By operating the scanner, the auxiliary detection aperture of the auxiliary detector is or the plurality of auxiliary detection apertures of the auxiliary detector are scanned in the plurality of auxiliary detection aperture positions with the focused first illumination light. In doing so, first intensity distributions of the first illumination light detected by the auxiliary detector are registered over different settings of the scanner.

As an alternative, the first intensity distributions may be registered in that a first further auxiliary detection aperture of a first further auxiliary detector concentrically arranged with respect to a first emission aperture of the first light source is scanned with auxiliary light that emerges through the auxiliary emission aperture or the plurality of auxiliary emission apertures of the auxiliary light source in the plurality of auxiliary emission aperture positions by operating the scanner. Then, the first intensity distribution are those of the auxiliary light, and they are registered by the first further auxiliary detector over the different settings of the scanner. An auxiliary emission aperture of the first and any other light source or auxiliary light source here means the cross-sectional area out of which the illumination light emerges. If the respective light source provides collimated light, each beam cross section of the collimated light may also be regarded as an emission aperture, and it may be used as an emission aperture for the purposes of the present disclosure.

Further, the first detection aperture of the first detector is scanned with the auxiliary light that emerges through the auxiliary emission aperture or the plurality of auxiliary emission apertures of the auxiliary light source in the plurality of auxiliary emission aperture positions by operating the scanner. In doing so, second intensity distributions of the auxiliary light detected by the detector are registered over the different settings of the scanner.

As an alternative, the second intensity distributions may be registered in that the auxiliary detection aperture of the auxiliary detector is or the plurality of auxiliary detection apertures of the auxiliary detector are scanned in the plurality of auxiliary detection aperture positions with first further auxiliary light that emerges through a first further auxiliary emission aperture of a first further auxiliary light source arranged concentrically with respect to the first detection aperture by operating the scanner. In doing so, the second intensity distributions are those of the first further auxiliary light, and they are registered by the auxiliary detector over the different setting of the scanner.

If a plurality of auxiliary detection or emission apertures are provided which are arranged at distances laterally with respect to the optical axis, the plurality of auxiliary detection or emission apertures, in being scanned, should be separated by their lateral distances to such an extent that the first or second intensity distributions, respectively, are registered separately or may at least be separated from one another. However, the lateral distances should also not be much higher than necessary for this purpose.

The intensity distributions are compared to one another. In doing so, a focus position of a focus of the focused first illumination light of the first light source in the focal area in direction of the optical axis is determined from differences between the first intensity distributions, and an image position of an image of the first detection aperture of the first detector in the focal area in direction of the optical axis is determined from differences between the second intensity distributions. For these purposes, it is advantageous, if the diameters of the auxiliary detection and emission apertures, respectively, is about as large as or smaller than the diameter of the focus of the focused first illumination light in the focal area or the diameter of the image of the first detection aperture in the focal area, respectively.

If the focus position and the image position are identical, an axial confocality of the scanning and descanning microscope component group is given. However, the relevant axial confocality is only given if the focus position of the focus of the focused first illumination light of the first light source and the image position of the image of the first detection aperture of the first detector coincide in direction of the optical axis in an object focal area on an object side of an objective. If the wavelengths of the first illumination light and the first light detected by the first detector differ, this, for example due to wavelength dependent properties of the objective, does not need to mean that the focus position and the image position do also coincide in any other focal area, i.e. in the focal area in which the at least one of the auxiliary detector and the auxiliary light source is arranged.

If the focus position and the image position do not coincide in the relevant object focal area, the focus position and the image position may be aligned in the object focal area by means of at least one of a real relative shift and a virtual relative shift of the first detection aperture of the first detector with respect to the first light source. In any focal area, the deviations of the focus position from a target focus position and of the image position from a target image position may be determined from the differences between the first intensity distributions and the differences between the second intensity distributions, respectively. These deviations may then be compensated for by real or virtual shifts of at least one of the first detection aperture of the first detector and of the first light source. The target focus position and the target image position are to be set such that the focus position of the focus of the focused first illumination light of the first light source and the image position of the image of the first detection aperture of the first detector coincide in direction of the optical axis in an object focal area on the object side of an objective. In virtual shifts, the at least one of the first detection aperture of the first detector and the first light source is not shifted as such but optical elements which preferably selectively have an influence on the first light on its way to the first detection aperture or on the first illumination light on its way from the first light source are moved or changed otherwise.

The areas of the two dimensional intensity distributions are of particular importance in the relevant differences between the first intensity distributions and the second intensity distributions, from which the focus position and the image position are determined respectively. These are, for example, the respective smallest areas onto which a certain percentage of the intensity falls upon, or the areas within which a certain threshold value, for example a percentage of the average or maximum intensity of the intensity distribution is exceeded by the intensity. The focus position or image position of interest is found there, where the area of the respective intensity distribution has a minimum along the optical axis. This minimum may be located at one or between several auxiliary detection or emission aperture positions, respectively. If the beam shape of the respective illumination light, auxiliary light or further auxiliary light in the area of the respective detector, auxiliary detector or further auxiliary detector is known so that it is for example known whether it is a Gauß beam having a certain beam waist and Rayleigh length, two different auxiliary detection or emission aperture positions along the optical axis are sufficient. In order to find the minimum without detailed previous knowledge for sure, three different auxiliary detection or emission aperture positions along the optical axis which are also distributed around the focus position or the image position are advantageous. Besides the areas of the intensity distributions, their shapes may also be considered in looking at their differences. To increase the significance of the shapes of the intensity distributions, a distortion, like for example an astigmatism, may purposefully be introduced in the focusing optics as it is generally known to one skilled in the art.

For testing the lateral confocality, one may resort to the teaching of WO 2020/254 303 A1. Thus, the measure of an existing deviation from a desired lateral confocality of the scanning and descanning microscope component group may be deduced from a comparison of one of the first intensity distributions with one of the second intensity distributions, particularly from the comparison of the positions of at least one of their maxima, their centers and their centers of intensity. This conclusion is particularly simple, if the first and second intensity distributions compared to each other correspond to the same auxiliary detection and emission aperture positions. Otherwise, the differences between the auxiliary detection and emission aperture positions on which the first and second intensity distributions are based have to be considered.

In order to set up a laser scanning microscope, the scanning and descanning microscope component group may comprise an objective. Then, the at least one of the auxiliary detector and the auxiliary light source, i.e. the auxiliary detection aperture positions or the auxiliary emission aperture positions or both of them, may be arranged around an object plane of a microscope beam path of such a laser scanning microscope. However, this arrangement in the area of the object plane is only possible temporarily, because the samples to be investigated with the laser scanning microscope are to be arranged here. Further, the auxiliary detection and emission apertures and the distances of their auxiliary detection and emission aperture positions would have to be microscopically small for their arrangement in the area of the object plane. Even with an arrangement of the auxiliary detection aperture positions and auxiliary emission aperture positions around an intermediate image plane of the microscope beam path, it may be necessary to remove the auxiliary detector and the auxiliary light source, respectively, for actually using the laser scanning microscope. If, however, the auxiliary detection aperture positions or the auxiliary emission aperture positions or both of them are arranged around an intermediate image plane in a branch branching off a main beam path of the microscope, the auxiliary detector or the auxiliary light source or both of them may be stationary arranged there.

In order to be for sure able to determine the focus position and the image position from the first and second intensity distributions, respectively, it proves to be advantageous, if the auxiliary detection aperture positions or the auxiliary emission aperture positions or both of them are distributed along the optical axis over a distance from 0.5 mm to 10 mm. This absolute indication of the distance relates to the arrangement of the respective auxiliary detection or emission apertures around an intermediate image plane of the microscope beam path, i.e. on the side of the objective facing away from the object side. Related to an magnification M between the object focal area on the object side of the objective and the intermediate image plane around which the respective auxiliary detection or emission aperture positions are arranged, the magnification M being proportional to the magnification of the objective, the distance over which the respective auxiliary detection or emission aperture positions are preferably distributed along the optical axis is in a range from $0.2\ \mu m \times M^2$ to $1\ \mu m \times M^2$.

Advantageously, the plurality of auxiliary detection apertures of the auxiliary detector or the plurality of auxiliary emission apertures of the auxiliary light source or both of them have same dimensions and shapes orthogonal to the optical axis, i.e. when being viewed along the optical axis. Only then, the first and second intensity distributions can be directly compared with one another. Preferably, the auxiliary detection aperture(s) of the auxiliary detector and the auxiliary emission aperture(s) of the light source are not only concentric but also congruent or even identcal in pairs. In order to achieve this, at least one photoelectric component may be used both as a part of the auxiliary light source and as a part of the auxiliary detector. This photoelectric component may, for example, be a photo diode. Alternatively, the auxiliary detection aperture or the auxiliary detection apertures of the auxiliary detector, or the auxiliary emission aperture or the auxiliary emission apertures of the light source, or both of them may be formed with an terminal cross section of an optical fiber. This optical fiber may be branched towards the auxiliary light source, on the one hand, and towards the auxiliary detector, on the other hand. This branching may, for example, be realized by an open beam splitter, a fiber optical beam splitter or a circulator.

In a preferred embodiment, the auxiliary detection apertures of the auxiliary detector or the auxiliary emission apertures of the auxiliary light source or both of them are formed by means of holes in different layers of a layered structure or in different depths of a plate. On the backside of the layered structure or the plate, the beam path may be branched towards the auxiliary light source and the auxiliary detector.

The scanning and descanning microscope component group may further comprise a second light source providing second illumination light, wherein the focusing optics focus the second illumination light along the optical axis into the focal area. If the auxiliary detection aperture of the auxiliary detector is, or the plurality of auxiliary detection apertures of the auxiliary detector are then scanned in the plurality of auxiliary detection aperture positions with the focused second illumination light by operating the scanner, wherein further first intensity distributions of the second illumination light detected by the auxiliary detector are registered over the different positions of the scanner, a further focus position of a focus of the focused second illumination light of the second light source in the focal area in direction of the optical axis may then be determined from differences between the further first intensity distributions. Thus, the axial confocality of the scanning and descanning microscope component group may also be tested with regard to the second illumination light. This second illumination light may, for example, be fluorescence inhibiting light, more particularly so-called STED light.

As an alternative, the further first intensity distributions may be registered in that a second further auxiliary detection aperture of a second further auxiliary detector concentrically arranged with respect to a second emission aperture of the second light source is scanned with auxiliary light that emerges through the auxiliary emission aperture or the plurality of auxiliary emission apertures of the auxiliary light source in the plurality of auxiliary emission aperture positions by operating the scanner. Then, the further first intensity distributions are those of the auxiliary light, and they are registered by means of the separate second auxiliary detector over the different positions of the scanner.

Generally, the light source or any auxiliary light source may comprise at least one of a light emitting diode (LED), a superluminescent diode, and a laser diode.

The scanning and descanning microscope component group may further have a second detector detecting second light coming out of the focal area, the second detector having a second detection aperture. In the normal use of the scanning and descanning microscope component group, this second light may, for example, have another wavelength and may origin from other emitters than the first light. For testing the confocality of the scanning and descanning microscope component group also with respect to the second detector, the second detection aperture of the second detector may be scanned with the auxiliary light that emerges through the auxiliary emission aperture or the plurality of auxiliary emission apertures of the auxiliary light source in the plurality of auxiliary emission aperture positions by operating the scanner, wherein further second intensity distributions of the auxiliary light detected by the second detector are registered over the settings of the scanner. Then, a further image position of an image of the second detection aperture of the second detector in the focal area in direction of the optical axis may be determined from differences between the further second intensity distributions, which allows for conclusions on the axial confocality.

As an alternative, the further second intensity distributions may be registered in that the auxiliary detection aperture is, or the plurality of auxiliary detection apertures of the auxiliary detector are scanned in the plurality of auxiliary detection aperture positions with second further auxiliary light that emerges through a second further auxiliary emission aperture of a second further auxiliary light source concentrically arranged with respect to the second detection aperture by operating the scanner. Here, the further second intensity distributions are those of the second further auxiliary light, and they are registered by means of the auxiliary detector over the settings of the scanner.

Besides the first light source, the focusing optics, the first detector and the scanner, the scanning and descanning microscope component group of the present disclosure comprises at least one of the auxiliary detector already defined above and the auxiliary light source already defined above as well as a testing device which is configured for registering the first and second intensity distributions. The comparison of the intensity distributions may also be executed by the testing device. Further, the testing device may be configured not only for determining deviations of the focus position from a target focus position and of the image position from a target image position but also for compensating these deviations by at least one of real relative shifts and virtual relative shifts of the first detection aperture of the first detector with respect to the first light source. Once again, the target focus position and the target image position are preferably set such that the focus position of the focus of the focused first illumination light of the first light source and the image position of the image of the first detection aperture of the detector, in order to establish the axial confocality, coincide in direction of the optical axis in an object focal area on an object side of an objective added to the scanning and descanning microscope component group for setting up a laser scanning microscope.

For establishing the lateral confocality, the testing device may apply the teaching of WO 2020/254 303 A1 which is incorporated herein by reference.

An auxiliary device according for testing the confocality of a scanning and descanning microscope component group has a connector configured for connection to the scanning and descanning microscope component group in a defined relative position. The optical axis, along which the auxiliary detection aperture positions of the auxiliary detector already defined above and the auxiliary emission aperture positions of the auxiliary light source already defined above, respectively, are arranged as parts of the auxiliary device, runs at a fixed orientation to the connector. With regard to all details, the auxiliary detector and the auxiliary light source may be designed as already explained above. The connector of the auxiliary device may be a standardized connector, and it may, for example, fit to an objective connector of the scanning and descanning microscope component group.

Figure 1:
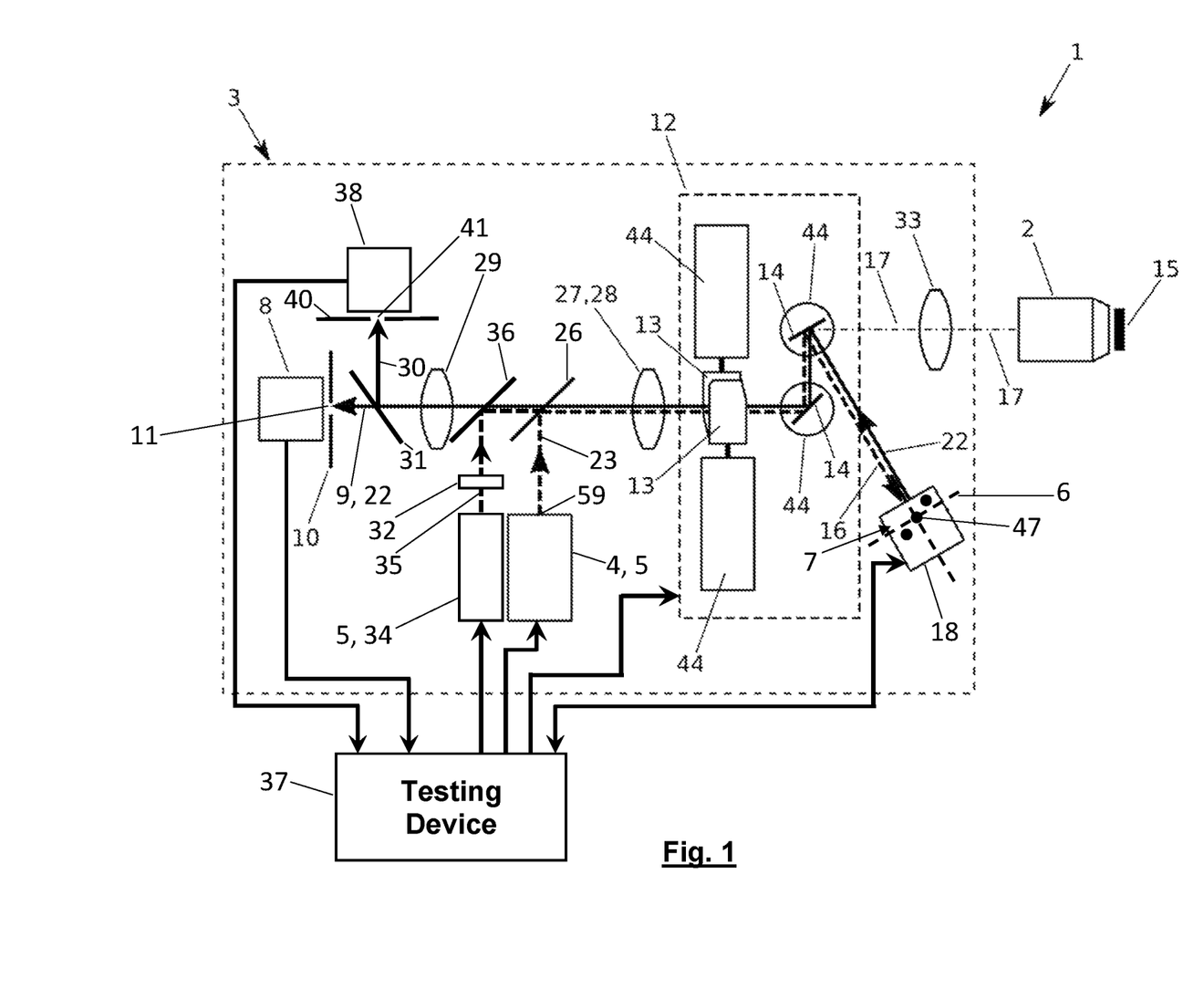
FIG. 1 shows a laser scanning microscope comprising a microscope component group.

Now referring in greater detail to the drawings, the laser scanning microscope 1 schematically depicted in FIG. 1 includes an objective 2 and further components of a microscope component group 3 which are enclosed by a dashed line. A first light source 4, particularly in form of a laser 5, for providing first illumination light 23 belongs to the microscope component group 3. Further, optics 27 focusing the illumination light 23 into a focus 47 in a focal area 7 around a focal plane 6 belong to the microscope component group 3. In FIG. 1, the focal plane 6 is depicted by a dashed line. In FIG. 1, only one lens 28 is depicted as a component of the focusing optics 27. Further, a detector 8 for first light 9 coming out of the focal area 7 belongs to the microscope component group 3. A pinhole aperture 10 and further optics 29 focusing the light 9 to be detected by the detector 8 onto the aperture of the pinhole aperture 10 are arranged in front of the actual detector 8, i.e. its light sensitive area. The aperture of the pinhole aperture 10 defines a detection aperture 11 of the detector 8 which, with a correct adjustment of the microscope component group 3, is arranged confocally with respect to the focus 47 in the focal area 7. A scanner 12 of the microscope component group 3 is arranged between the light source 4 and the detector 8 with the pinhole aperture 10, on the one side, and the focal plane 6, on the other side. The lens 28 of the optics 27 is on that side of the scanner 12 facing towards the light source 4 and the detector 8. The scanner 12 includes two rotating mirrors 13, 14 per lateral direction, in which the scanner 12 is provided for scanning a sample 15 arranged in front of the objective 2 with the illumination light 23 from the light source 4. To each rotating mirror 13, 14, a rotary drive 44 is assigned. The scanner 12 does not only serve for scanning the sample 15 with the illumination light 23 but also for descanning the light 9 that is caused by the illumination light 23 in the sample 15 such that this light is spatially selectively detected by the detector 8. Here, an exact confocality of the microscope component group 3, i.e. an exact coincidence of the focus of the illumination light 23 focused in the sample 15 with an image of the detection aperture 11 of the detector 8 in the sample 15 is decisive. This confocality is tested in the focal plane 6 depicted in FIG. 1. This focal plane 6 is located in a branch 16 branching off the main beam path 17 of the laser scanning microscope 1 and corresponds to an intermediate image plane in the main beam path 17. A tube lens 33 is arranged in the main beam path 17 between the scanner 12 and the objective 2. The branch 16 branches off the main beam path 17 at the last rotating mirror 14 of the scanner 12 in front of the objective 2. If the branch is activated by means of this last rotating mirror 14, the other rotating mirrors 13, 14 are usable for scanning the auxiliary device 18 arranged in the branch 16. With respect to the further components of the microscope component group 3, the auxiliary device 18 is in a spatially fixed position around the focal plane 6, and it is reachable with the illumination light 23 by operating the scanner 12.

The beam path of the first illumination light 23 from the first light source 4 and the beam path of the first light 9 to be detected by the first detector 8 are separated by means of a beam splitter 26. A further beam splitter 36 separates the beam path of second illumination light 35 from a second light source 24 which typically is also made as a laser 5 from the beam path of the light 9. A beam shaper 32 is arranged in the beam path of the second light 35. The beam shaper 32 may be provided for forming an intensity distribution of the second illumination light 35 having a central intensity minimum in the focal area 7 as it is usual for fluorescence inhibiting light, particularly STED light for resolution enhancement. A further beam splitter 31 separates a beam path of second light 30 to be detected from the beam path of the first light 9 to be detected, wherein the first light 9 and the second light 30 may particularly differ in their wavelengths. The second light 30 is detected by a second detector 38 whose second detection aperture 41 is defined by a further pinhole aperture 40.

Further, a testing device 37 is schematically depicted in FIG. 1, which is connected to the light sources 4, 34, the detectors 8, 38, the scanner 12 and the auxiliary device 18, and which tests the confocality of the scanning and descanning microscope component group 3 with the aid of these connections.

Except of the additional second light source 34, the additional second detector 38, the depiction of the testing device 37 and the only schematic depiction of the auxiliary device 18, FIG. 1 corresponds to FIG. 5 of WO 2020/254 303 A1. The other embodiments of the scanning and descanning microscope component group 3 disclosed in WO 2020/254 303 A1 and of a laser scanning microscope 1 set up therewith may be upgraded and used with an auxiliary device 18 as it will be further explained in the following. Insofar, reference is made to the disclosure of scanning and descanning microscope component groups 3 and laser scanning microscopes 1 in WO 2020/254 303 A1.

Figure 2:
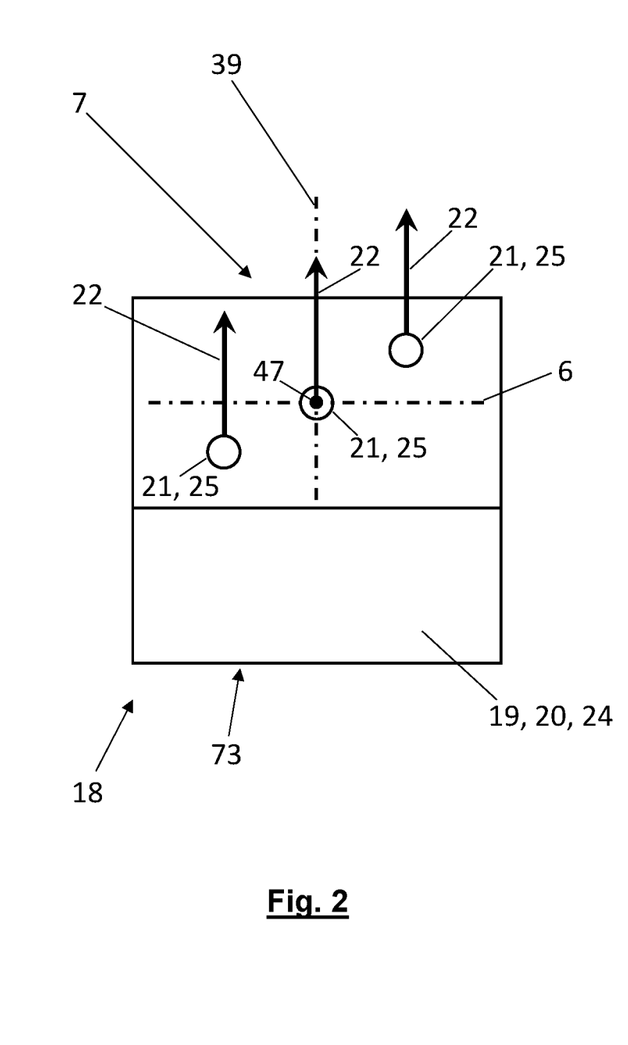
FIG. 2 shows a first embodiment of an auxiliary apparatus of the laser scanning microscope according to FIG. 1.

FIG. 2 schematically illustrates an embodiment of the auxiliary device 18. The focal plane 6 and the focal area 7 as well as an optical axis 39 of the branch 16, along which the illumination light 23 is incident on the auxiliary device 18, are depicted. Here, the auxiliary device 18 comprises a photoelectric component 19 which is usable both as an auxiliary light source 20 and as an auxiliary detector 24. By means of pinhole apertures not depicted further in FIG. 2, three pairs of congruent or identical auxiliary emission apertures 21 of the auxiliary light source 20 and auxiliary detection apertures 25 of the auxiliary detector 24 are formed. The auxiliary emission apertures 21 and the auxiliary detection apertures 25 are arranged at distances in direction of the optical axis 39 and laterally thereto. A connector 73 not further specified in FIG. 2 serves for connecting the auxiliary device 18 in a defined relative position to the further components of the microscope component group 3.

After a first step in which the auxiliary emission apertures 21 and the auxiliary detection apertures 25 are arranged in the auxiliary emission and detection aperture positions at axial and lateral distances in the focal area 7, the auxiliary detection apertures 25 of the auxiliary detector 24 are scanned with the focused first illumination light 23 by operating the scanner 12 in a subsequent step in order to register first intensity distributions of the first illumination light 23 detected by the auxiliary detector 24 over different settings of the scanner 12. Then, in a next step, the photoelectric component 19 is activated as an auxiliary light source 20, and the first detection aperture 11 of the first detector 8 is scanned with the auxiliary light 22 emerging out of the auxiliary emission apertures 21 by operating the scanner 12. In doing so, second intensity distributions of the auxiliary light 22 detected by the first detector 8 are registered over the settings of the scanner 12. In a subsequent comparison of the light intensity distributions, a focus position of the focus 47 of the focused first illumination light 23 of the first light source 4 in the focal area 7 in direction of the optical axis 39 is determined from differences between the first intensity distributions. An image position of an image of the first detection aperture 11 of the first detector 8 in the focal area 7 in direction of the optical axis 39 is determined from differences between the second intensity distributions. With respect to the differences, the respective areas of the intensity distributions are particularly relevant. From the focus position determined and the image position determined, conclusions may be drawn on the axial confocality of the microscope component group 3, wherein the focus position and the image position do not need to coincide at the auxiliary device 18 but in the sample 15. Due to wavelength dependent properties of the objective 2 and different wavelengths of the illumination light 23 and the auxiliary light 22 this may require that the focus position and the image position in the focal area 7 at the auxiliary device 18 take target focus and target image positions which are arranged at a distance in the direction of the optical axis 39. By means of a comparison of the first and second intensity distributions, particularly in pairs belonging to a respective pair of auxiliary emission aperture 21 and auxiliary detection aperture 25, the lateral confocality of the microscope component group 3 is tested. This lateral confocality is achieved, if maxima, centers or centers of intensity of the first and second light intensity distributions along the focal plane 6 coincide in the focal area 7.

Figure 3:
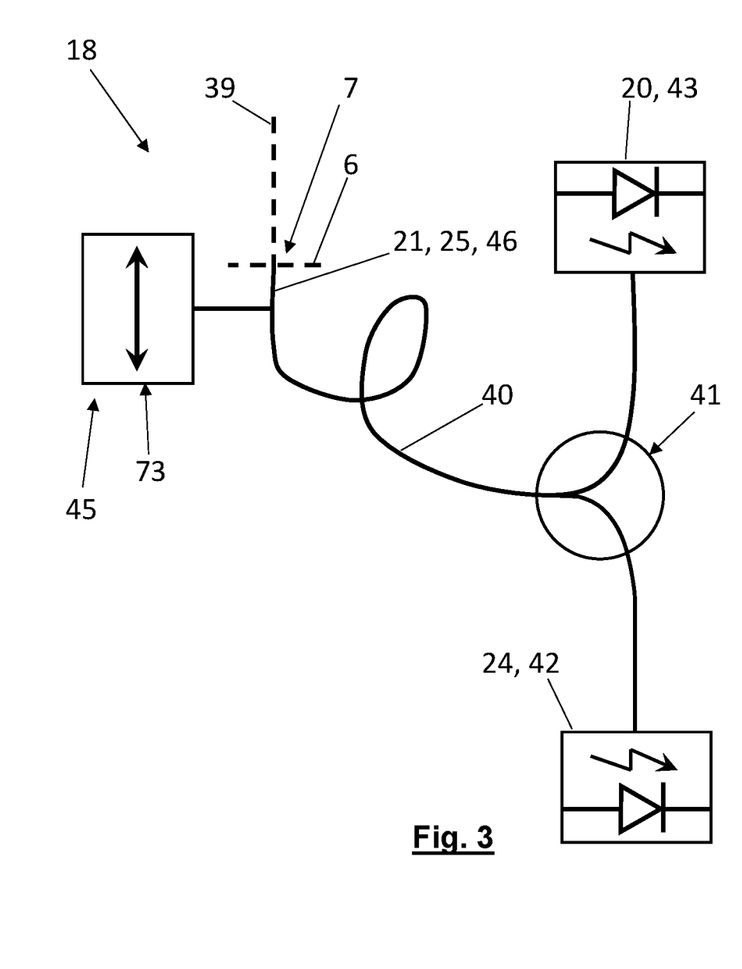
FIG. 3 shows a second embodiment of the auxiliary apparatus of the laser scanning microscope according to FIG. 1.

FIG. 3 shows an alternative embodiment of the auxiliary device 18 with only one auxiliary emission aperture 21 and one auxiliary detection aperture 25 coinciding therewith in the focal area 7 around the focal plane 6. Both apertures 21, 25 are formed by a terminal cross section 46 of an optical fiber 40. The optical fiber 40 branches via a circulator 41 towards a photo diode 42 serving as the auxiliary detector 24 and a laser diode 43 serving as the auxiliary light source 20. By means of a traversing unit 45 at which the connector 73 also not further specified in FIG. 3 is provided, the terminal cross section 46 is movable into different auxiliary emission aperture positions and auxiliary detection aperture positions, respectively. In each of these positions, a first light intensity distribution and a second light intensity distribution may then be registered with the aid of the scanner 12 according to FIG. 1. The traversing unit 45 may especially be configured for moving the terminal cross section 46 into a fixed number of discrete auxiliary emission aperture positions and auxiliary detection aperture positions, respectively, for example, into three such discrete positions. The circulator according to FIG. 3 is only one example of a beam splitter for branching the optical fiber 40 towards the auxiliary detector 24 and the auxiliary light source 20.

Figure 4:
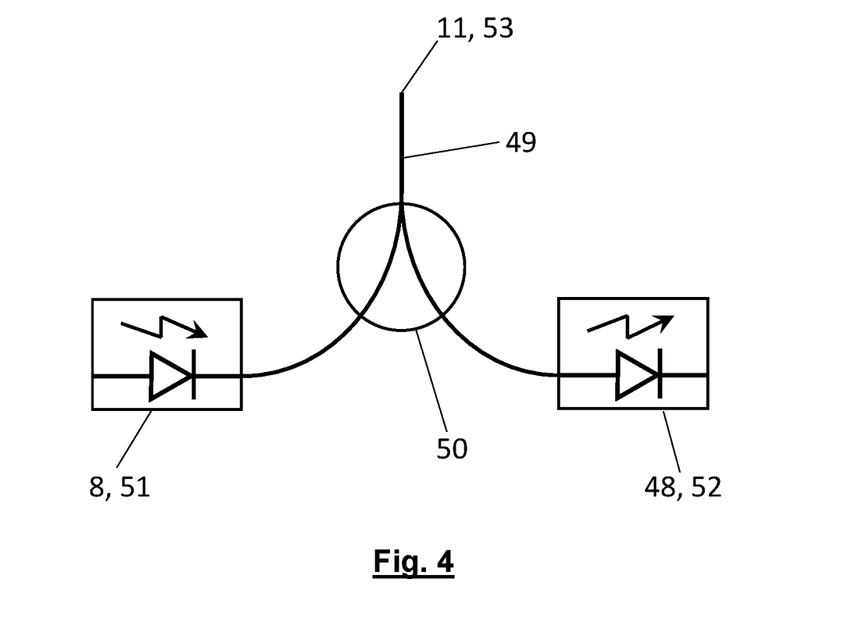
FIG. 4 illustrates a combination of a first detector and a first further auxiliary light source in a variation of the laser scanning microscope according to FIG. 1.

Instead of providing both an auxiliary detector 24 and an auxiliary light source 20 in the auxiliary device 18, the auxiliary device 18 may as well only be designed as an auxiliary detector 24 with a plurality of auxiliary detection apertures 25. Then, the first detector 8 and, if given, also the second detector 38 may be combined with a further auxiliary light source 48, like it is depicted in FIG. 4, for registering the second light intensity distributions. The first detection aperture 11 is formed by an optical fiber 49 which branches via a circulator 50 towards a photo diode 51 serving as the detector 8 and a laser diode 52 serving as the further auxiliary light source 48. The further auxiliary emission aperture 53 of the further auxiliary light source 48 is identical with the first detection aperture 11 of the first detector 8. The auxiliary detection apertures 25 or the movable auxiliary detection aperture 25 may be scanned in the different auxiliary detection aperture positions with the further light from the further auxiliary light source 48 emerging out of the further auxiliary emission aperture 63 in order to register the second intensity distributions by means of the auxiliary detector 24.

Figure 5:
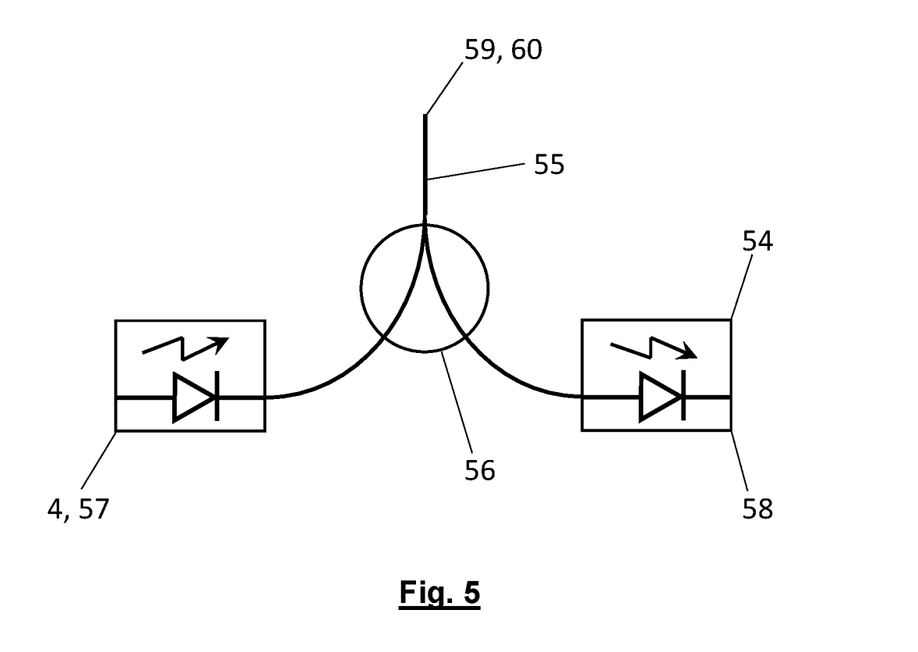
FIG. 5 illustrates a combination of a further light source and of a first further auxiliary detector in another variation of the laser scanning microscope according to FIG. 1.

Correspondingly, the auxiliary device 18 may, as an alternative, only comprise an auxiliary light source 20 with a plurality of auxiliary emission positions of its auxiliary emission aperture(s) 21. Then, the first light source 4 and correspondingly also the second light source 34 can be combined with a further auxiliary detector 54, like this is illustrated in FIG. 5, for registering the first intensity distributions. A terminal cross section of an optical fiber 55 which branches via a circulator 59 towards a laser diode 57 serving as the first light source 4 and a photo diode 58 serving as the further auxiliary detector 54 forms both a first emission aperture 59 of the first light source 4 and a further auxiliary detection aperture 60 of the further auxiliary detector 54. For registering the first intensity distributions by means of the further auxiliary detector 54, this further auxiliary detection aperture 60 is scanned with auxiliary light coming out of the auxiliary emission apertures 21 or the auxiliary emission aperture 21 in the different auxiliary emission aperture positions of the auxiliary light source 20. In FIGS. 4 and 5, the optical fibers 59 and 55, respectively, and their branching towards the photo diodes 51 and 58, respectively, and the laser diodes 52 and 57, respectively, are only exemplary. Further ways of implementing the detector 8 and the further auxiliary light source 48 with identical detection aperture 11 and further auxiliary emission aperture 53 or of the light source 4 and the further auxiliary detector 54 with identical emission aperture 59 and further auxiliary detection aperture 60 are available to one of ordinary skill in the art.

With regard to the direction of the irradiated or registered light, the diodes 42, 43, 51, 52, 57 and 58 in the FIGS. 3 to 5 are provided with self-designed symbols.

Figure 6:
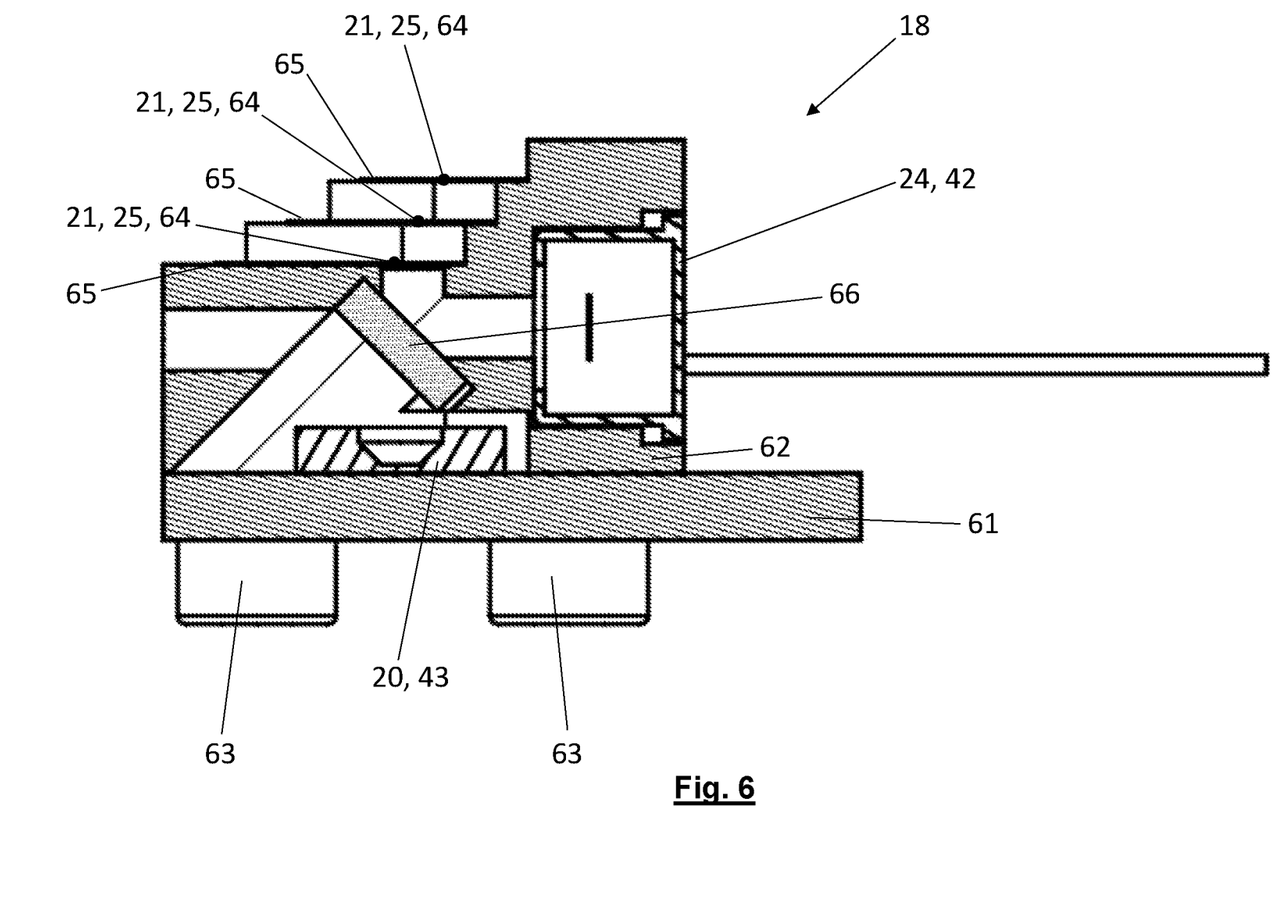
FIG. 6 shows a particular embodiment of an auxiliary apparatus for use in the laser scanning microscope according to FIG. 1.

In the embodiment of the auxiliary device 18 depicted in FIG. 6, different optical components are arranged on a base plate 61 serving as the connector 73 and in a base body 62, which are screwed together with screws 63. The auxiliary emission apertures 21 and auxiliary detection apertures 25 are formed in pairs by holes 64 in films 65 as it will be further explained in connection with FIG. 7. Behind the holes 64, a beam splitter 66 branches the beam path towards the photo diode 42 serving as the auxiliary detector 24 and the laser diode 43 serving as the auxiliary light source 20. Here, the beam splitter 66 is made as a 50/50 beam splitter.

Figure 7:
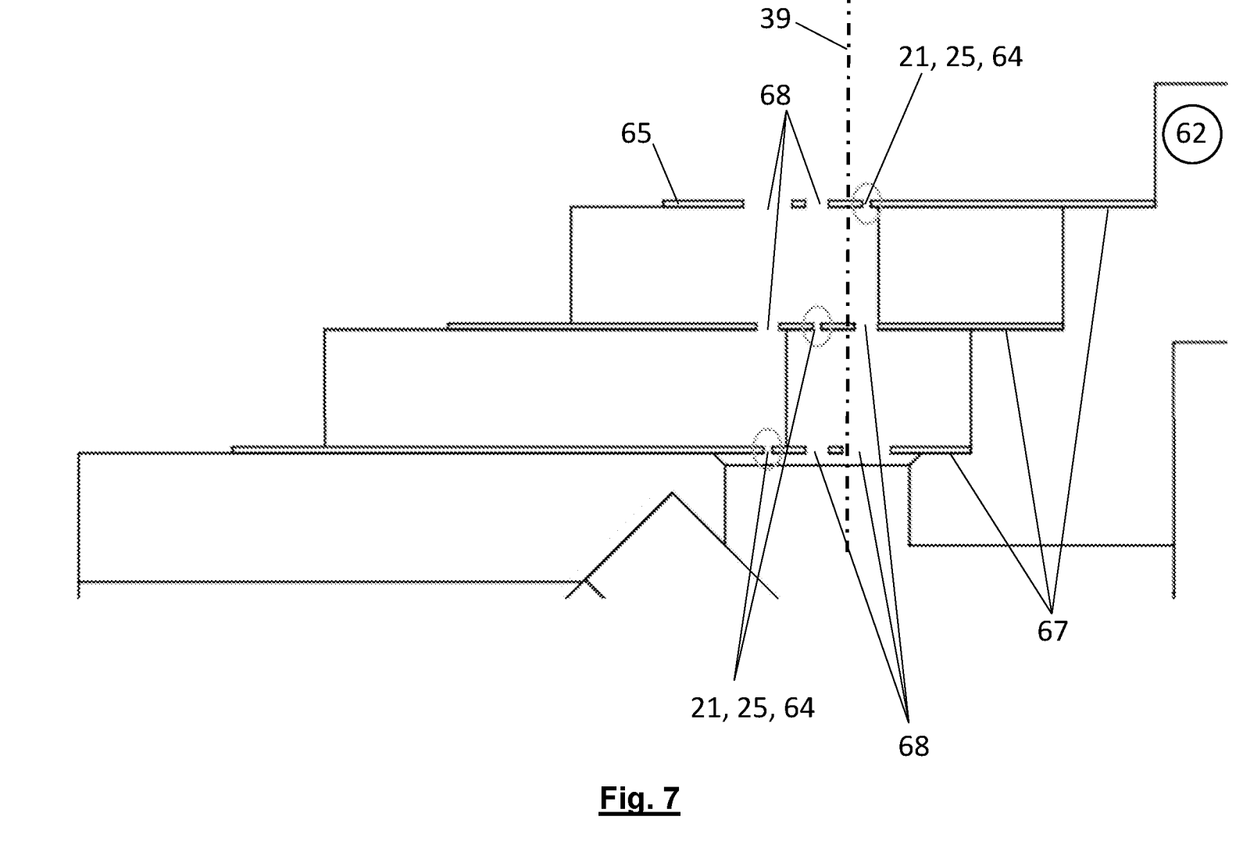
FIG. 7 shows a detail of the auxiliary apparatus according to FIG. 6.

FIG. 7 shows, how the holes 64 forming the auxiliary emission apertures 21 and the auxiliary detection apertures 25 are provided in the three films 65 mounted between boundary areas 67 of the base body 63 at distances along the optical axis 39. In each of the films 65, exactly one such hole 64 is provided. The holes 64 are arranged at lateral distances with respect to the optical axis 39. Along the optical axis 39 larger holes 68 are provided in the respective other films 65 which are aligned with the holes 64 and which have no influence on the respective auxiliary emission aperture 21 or auxiliary detection aperture 25.

Figure 8:
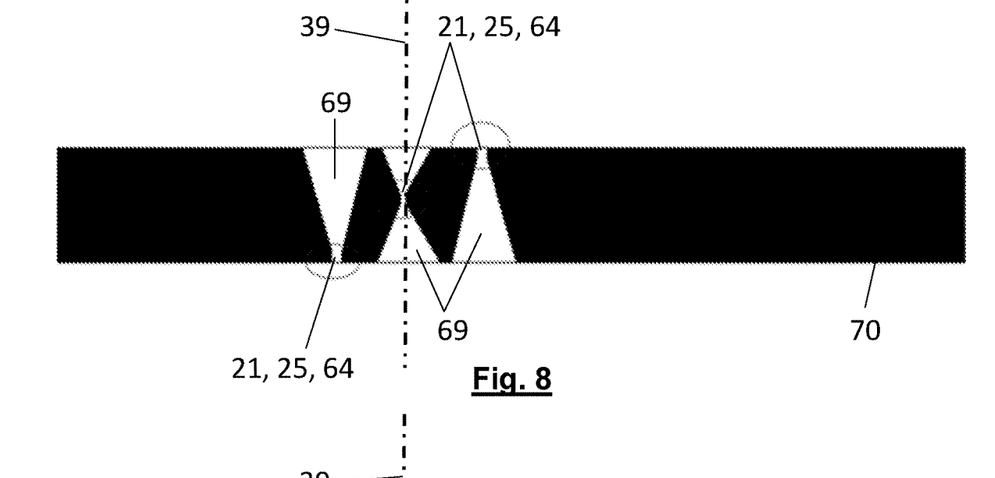
FIG. 8 shows an alternative embodiment of the detail according to FIG. 7.

FIG. 8 shows an alternative design of the holes 64 at different auxiliary emission or detection aperture positions along and crosswise with respect to the optical axis 39. Here, the holes 64 are the areas of smallest diameter of conical or double-conical holes 69 in a plate 70.

Figure 9:
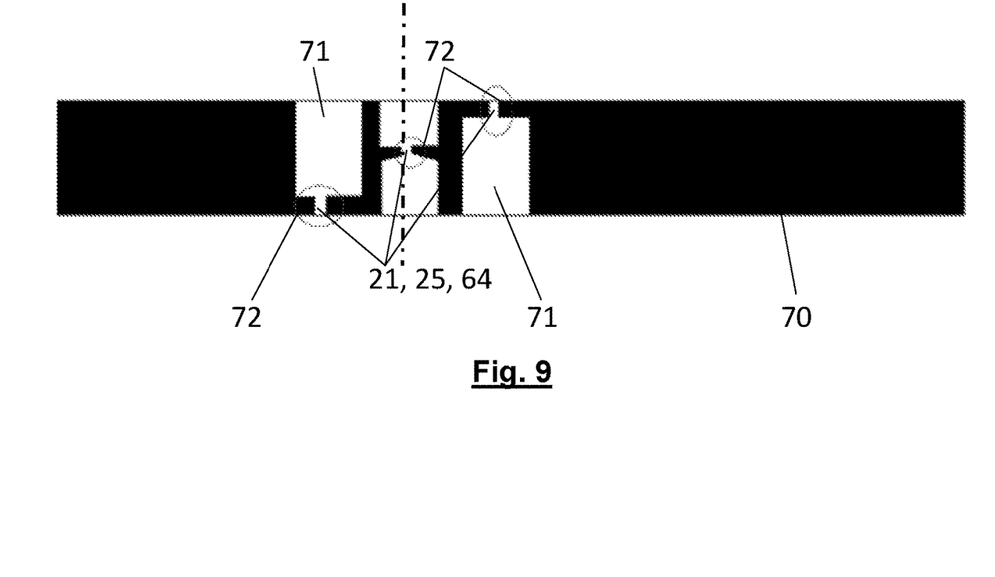
FIG. 9 shows a further alternative embodiment of the detail according to FIG. 7.

In the embodiment of the auxiliary emission apertures 21 and the auxiliary detection apertures 25 by means of the holes 64 according to FIG. 9, blind holes 71 are formed in the plate 70 until the plate 70 has been removed except of thin remainders 72 which are in different positions along the optical axis 39 and laterally thereto. One of the holes 64 has been formed in the center of each of these thin remainders 72.

Many variations and modifications may be made to the preferred embodiments of the invention without departing substantially from the spirit and principles of the invention. All such modifications and variations are intended to be included herein within the scope of the present invention, as defined by the following claims.

We claim:

1. A scanning and descanning microscope component group comprising
a first light source having a first emission aperture and providing first illumination light emerging through the first emission aperture;
focusing optics focusing the first illumination light along an optical axis into a focal area;
a first detector having a first detection aperture and detecting first light coming out of the focal area;
a scanner arranged between the first light source and the first detector, on its one side, and the focal area, on its other side, the scanner being scanning laterally with respect to the optical axis;
at least one of
a first auxiliary detector arranged or to be arranged in the focal area, the first auxiliary detector comprising a plurality of auxiliary detection apertures in a plurality of auxiliary detection aperture positions arranged at distances in direction of the optical axis and laterally with respect to the optical axis,
and
an auxiliary light source arranged or to be arranged in the focal area and providing auxiliary light, the auxiliary light source comprising a plurality of auxiliary emission apertures in a plurality of auxiliary emission aperture positions arranged at distances in direction of the optical axis and laterally with respect to the optical axis, the auxiliary light emerging through the plurality of auxiliary emission apertures,
wherein, if both the auxiliary detector and the auxiliary light source are arranged in the focal area, each auxiliary detection aperture is concentric with one auxiliary emission aperture; and
a testing device;
wherein
the testing device is configured for scanning the plurality of auxiliary detection apertures of the auxiliary detector in the plurality of auxiliary detection aperture positions with the focused first illumination light by operating the scanner, wherein the testing device registers first intensity distributions of the first illumination light detected by the auxiliary detector over different settings of the scanner, or
a first further auxiliary detector having a first auxiliary detection aperture arranged concentrically with respect to the first emission aperture of the first light source is provided and wherein the testing device is configured for scanning the first auxiliary detection aperture with the auxiliary light that emerges through the plurality of auxiliary emission apertures of the auxiliary light source in the plurality of auxiliary emission aperture positions by operating the scanner, wherein the testing device registers first intensity distributions of the auxiliary light detected by the first further auxiliary detector over different settings of the scanner;
and
wherein
the testing device is configured for scanning the first detection aperture of the first detector with the auxiliary light that emerges through the plurality of auxiliary emission apertures of the auxiliary light source in the plurality of auxiliary emission aperture positions by operating the scanner, wherein the testing device registers second intensity distributions of the auxiliary light detected by the first detector over the settings of the scanner, or
a first further auxiliary light source providing first further auxiliary light and having a first further auxiliary emission aperture, which is arranged concentrically with respect to the first detection aperture and through which the first further auxiliary light emerges, is provided, and wherein the testing device is configured for scanning the plurality of auxiliary detection apertures of the auxiliary detector in the plurality of auxiliary detection aperture positions with the first further auxiliary light by operating the scanner, wherein the testing device registers second intensity distributions of the first further auxiliary light detected by the first auxiliary detector over the settings of the scanner.

2. The scanning and descanning microscope component group of claim 1, wherein the testing device is configured for comparing the first intensity distributions and second intensity distributions and for determining a first focus position of a first focus of the focused first illumination light of the first light source in the focal area in direction of the optical axis from differences between the first intensity distributions and a first image position of a first image of the first detection aperture of the first detector in the focal area in direction of the optical axis from differences between the second intensity distributions.

3. The scanning and descanning microscope component group of claim 2, wherein the testing device is configured for determining deviations of the first focal position from a target focus position and of the first image position from a target image position and for compensating the deviations by at least one of a real and a virtual relative shift of the first detection aperture of the first detector with respect to the first emission aperture of the first light source.

4. The scanning and descanning microscope component group of claim 1, wherein the auxiliary detection apertures of the plurality of auxiliary detection apertures of the auxiliary detector have same shapes and dimensions orthogonal to the optical axis, and wherein the auxiliary emission apertures of the plurality of auxiliary emission apertures of the auxiliary light source have same shapes and dimensions orthogonal to the optical axis.

5. The scanning and descanning microscope component group of claim 1, wherein both the auxiliary detector and the auxiliary light source are arranged in the focal area, and wherein each auxiliary detection aperture of the plurality of auxiliary detection apertures of the auxiliary detector is congruent with one auxiliary emission aperture of the plurality of auxiliary emission apertures of the auxiliary light source.

6. The scanning and descanning microscope component group of claim 5, wherein at least one photoelectric component is both part of the auxiliary light source and the auxiliary detector.

7. The scanning and descanning microscope component group of claim 6, wherein the at least one photoelectric component is a photo diode.

8. The scanning and descanning microscope component group of claim 5, wherein each of the plurality of auxiliary detection apertures of the auxiliary detector and the respective one of the plurality of auxiliary emission apertures of the auxiliary light source are provided with an end cross section of an optical fiber, wherein the optical fiber is branched towards the auxiliary light source and the auxiliary detector by means of one of a beam splitter or a circulator.

9. The scanning and descanning microscope component group of claim 5, wherein the plurality of auxiliary detection apertures of the auxiliary detector and the plurality of auxiliary emission apertures of the auxiliary light source are provided with a plurality of holes in different layers of a layered structure or in different depths of a plate, wherein a beam path on the back side of the respective layered structure or plate branches towards the auxiliary light source and the auxiliary detector.

10. The scanning and descanning microscope component group of claim 1,
further comprising a second light source having a second emission aperture and providing second illumination light emerging through the second emission aperture, wherein the focusing optics focus the second illumination light along the optical axis in the focal area;
wherein
the testing device is configured for scanning the auxiliary detection aperture or the plurality of auxiliary detection apertures of the auxiliary detector in the plurality of auxiliary detection aperture positions with the focus second illumination light by operating the scanner, wherein the testing device registers further first intensity distributions of the second illumination light detected by the auxiliary detector over different settings of the scanner, or
a second further auxiliary detector having a second further auxiliary detection aperture arranged concentrically with respect to a second emission aperture of the second light source is provided, wherein the testing device is configured for scanning the second further auxiliary detection aperture with the auxiliary light that emerges through the auxiliary emission aperture or the plurality of emission apertures of the auxiliary light source in the plurality of auxiliary emission aperture positions by operating the scanner, wherein the testing device registers further first intensity distributions of the auxiliary light detected by the second further auxiliary detector over different settings of the scanner;
and
wherein the testing device is configured for determining a second focus position of a second focus of the focused second illumination light of the second light source in the focal area in direction of the optical axis from differences between the further first intensity distributions.

11. The scanning and descanning microscope component group of claim 1, wherein the second illumination light provided by the second light source is fluorescence inhibiting light.

12. The scanning and descanning microscope component group of claim 1,
further comprising a second detector having a second detection aperture and detecting second light coming out of the focal area;
wherein
the testing device is configured for scanning the second detection aperture of the second detector with the auxiliary light that emerges through the auxiliary emission aperture or the plurality of auxiliary emission apertures of the auxiliary light source in the plurality of auxiliary emission aperture positions by operating the scanner, wherein the testing device registers further second intensity distributions of the auxiliary light detected by the second detector over the settings of the scanner, or
a second further auxiliary light source providing second further auxiliary light and having a second further auxiliary emission aperture, which is arranged concentrically with respect to the second detection aperture and through which the second further auxiliary light emerges, is provided, wherein the testing device is configured for scanning the auxiliary detecting aperture or the plurality of auxiliary detection apertures of the auxiliary detector in the plurality of auxiliary detection aperture positions with the second further auxiliary light from the second further auxiliary light source by operating the scanner, wherein the testing device registers further second intensity distributions of the second further auxiliary light detected by the first auxiliary detector over the settings of the scanner;

and wherein the testing device is configured for determining a second image position of a second image of the second detection aperture of the second detector in the focal area in direction of the optical axis from differences between the further second intensity distributions.

13. The scanning and descanning microscope component group of claim 1, further comprising a microscope objective, and a main microscope beam path including the first light source, the focusing optics, the first detector the scanner and the microscope objective;

wherein the plurality of auxiliary detection aperture positions and the plurality of auxiliary emission aperture positions, so far as provided, are arranged around an intermediate image plane of the main microscope beam path or around an intermediate image plane in a branch that branches off the main microscope beam path.

14. The scanning and descanning microscope component group of claim 13, wherein the plurality of auxiliary detection aperture positions and the plurality of auxiliary emission aperture positions, so far as provided, are distributed along the optical axis over a distance in at least one of a first range from 0.5 mm to 10 mm and a second range from 0.2 $\mu m \times M^2$ to 1 $\mu m \times M^2$, wherein M is a magnification between an object focal area on an object side of the objective and the intermediate image plane.

15. A scanning and descanning microscope component group comprising a first light source having a first emission aperture and providing first illumination light emerging through the first emission aperture;

focusing optics focusing the first illumination light along an optical axis into a focal area;

a first detector having a first detection aperture and detecting first light coming out of the focal area;

a scanner arranged between the first light source and the first detector, on its one side, and the focal area, on its other side, the scanner being scanning laterally with respect to the optical axis;

at least one of a first auxiliary detector arranged or to be arranged in the focal area, the first auxiliary detector comprising an auxiliary detection aperture that is moveable into a plurality of auxiliary detection aperture positions arranged at distances in direction of the optical axis, and an auxiliary light source arranged or to be arranged in the focal area and providing auxiliary light, the auxiliary light source comprising an auxiliary emission aperture moveable into a plurality of auxiliary emission aperture positions arranged at distances in direction of the optical axis, the auxiliary light emerging through the auxiliary emission aperture, wherein, if both the auxiliary detector and the auxiliary light source are arranged in the focal area, each auxiliary detection aperture is concentric with one auxiliary emission aperture; and a testing device;

wherein the testing device is configured for scanning the auxiliary detection aperture of the auxiliary detector in the plurality of auxiliary detection aperture positions with the focused first illumination light by operating the scanner, wherein the testing device registers first intensity distributions of the first illumination light detected by the auxiliary detector over different settings of the scanner, or a first further auxiliary detector having a first auxiliary detection aperture arranged concentrically with respect to the first emission aperture of the first light source is provided and wherein the testing device is configured for scanning the first auxiliary detection aperture with the auxiliary light that emerges through the auxiliary emission aperture of the auxiliary light source in the plurality of auxiliary emission aperture positions by operating the scanner, wherein the testing device registers first intensity distributions of the auxiliary light detected by the first further auxiliary detector over different settings of the scanner;

and wherein the testing device is configured for scanning the first detection aperture of the first detector with the auxiliary light that emerges through the auxiliary emission aperture of the auxiliary light source in the plurality of auxiliary emission aperture positions by operating the scanner, wherein the testing device registers second intensity distributions of the auxiliary light detected by the first detector over the settings of the scanner, or a first further auxiliary light source providing first further auxiliary light and having a first further auxiliary emission aperture, which is arranged concentrically with respect to the first detection aperture and through which the first further auxiliary light emerges, is provided, and wherein the testing device is configured for scanning the auxiliary detection aperture of the auxiliary detector in the plurality of auxiliary detection aperture positions with the first further auxiliary light by operating the scanner, wherein the testing device registers second intensity distributions of the first further auxiliary light detected by the first auxiliary detector over the settings of the scanner.

16. The scanning and descanning microscope component group of claim 15, wherein the testing device is configured for comparing the first intensity distributions and second intensity distributions and for determining a first focus position of a first focus of the focused first illumination light of the first light source in the focal area in direction of the optical axis from differences between the first intensity distributions and a first image position of a first image of the first detection aperture of the first detector in the focal area in direction of the optical axis from differences between the second intensity distributions.

17. The scanning and descanning microscope component group of claim 15, wherein both the auxiliary detector and the auxiliary light source are arranged in the focal area, and wherein the auxiliary detection aperture of the auxiliary detector is congruent with the auxiliary emission aperture of the auxiliary light source.

18. An auxiliary apparatus for testing the confocality of a scanning and descanning microscope component group, the auxiliary apparatus comprising a connector configured for connecting the auxiliary apparatus in a defined relative position to the scanning and descanning microscope component group;

an optical axis running at a fixed orientation with respect to the connector;

an auxiliary detector comprising
- an auxiliary detection aperture moveable with respect to the connector into a plurality of auxiliary detection aperture positions that are arranged at distances in direction of the optical axis, or
- a plurality of auxiliary detection apertures in a plurality of auxiliary detection aperture positions that are arranged at distances in direction of the optical axis and laterally with respect to the optical axis;

and an auxiliary light source providing auxiliary light and comprising
- an auxiliary emission aperture moveable with respect to the connector into a plurality of auxiliary emission aperture positions arranged at a distance in direction of the optical axis, or
- a plurality of auxiliary emission apertures in a plurality of auxiliary emission aperture positions arranged at distances in direction of the optical axis and laterally with respect to the optical axis.

19. The auxiliary apparatus of claim 18, wherein each auxiliary detection aperture position of the plurality of auxiliary detection aperture positions is equal to one auxiliary emission aperture position of the plurality of auxiliary emission aperture positions.

20. The auxiliary apparatus of claim 18, wherein the plurality of auxiliary detection aperture positions and the plurality of auxiliary emission aperture positions are distributed along the optical axis over a distance in a range from 0.5 mm to 10 mm.

21. The auxiliary apparatus of claim 18, wherein the auxiliary detection and emission apertures have same shapes and dimensions orthogonal to the optical axis.

22. The auxiliary apparatus of claim 19, wherein at least one photoelectric component is both part of the auxiliary light source and part of the auxiliary detector.

23. The auxiliary apparatus of claim 22, wherein the photoelectric component is a photo diode.

24. The auxiliary apparatus of claim 18, wherein the light source comprises at least one photoelectric component selected from a light emitting diode, a superluminescent diode and a laser diode.

25. The auxiliary apparatus of claim 19, wherein each auxiliary detection aperture of the auxiliary detector and the respective auxiliary emission aperture of the auxiliary light source are provided with an end cross section of an optical fiber, wherein the optical fiber is branched towards the auxiliary light source and the auxiliary detector by means of one of an open beam splitter, a fiber optical beam splitter or a circulator.

26. The auxiliary apparatus of claim 22, the auxiliary detector comprising the plurality of auxiliary detection apertures and the auxiliary light source comprising the plurality of auxiliary emission apertures, wherein the plurality of auxiliary detection apertures of the auxiliary detector and the plurality of auxiliary emission apertures of the auxiliary light source are provided with a plurality of holes in different layers of a layered structure or in different depths of a plate, wherein a beam path on the back side of the respective layered structure or plate branches towards the auxiliary light source and the auxiliary detector.

* * * * *